April 15, 1958 J. H. KIRBY II 2,830,663
PERMANENT MAGNET FISHING TOOL
Filed Nov. 2, 1953 3 Sheets-Sheet 2

United States Patent Office 2,830,663
Patented Apr. 15, 1958

2,830,663

PERMANENT MAGNET FISHING TOOL

John H. Kirby II, Houston, Tex.

Application November 2, 1953, Serial No. 389,692

The portion of the term of the patent subsequent to February 2, 1971, has been disclaimed 10 Claims. (Cl. 166—65)

This invention pertains to tools for removing undesired materials from a well and more particularly to a magnetic tool for fishing ferro-magnetic junk out of a hole in the earth drilled by the rotary method.

This application is a continuation-in-part of my prior applications Serial Number 239,901, filed August 2, 1951, entitled "Well Tool" and Serial Number 301,682, filed July 30, 1952, entitled "Magnetic Fishing Tool," now Patent No. 2,668,077.

It is the principal object of the invention to provide a magnetic fishing tool which will be very efficient in the removal of junk.

A more specific object of the invention is to provide a magnetic fishing tool in which the distribution of the magnetic field is controlled so as to make it very effective for holding magnetic junk.

A further object of the invention is to provide a magnetic fishing tool having fluid circulation means for clearing mud and detritus away from the magnetic junk wherein the fluid path is so positioned as to have a very effective field of action.

Still another object of the invention is to provide a magnetic fishing tool having a rotary shoe for clearing heavy and consolidated materials away from the magnetic junk wherein the shoe is positioned so its field of mechanical action cooperates very effectively with the magnetic and fluid-dynamic fields.

Another object of the invention is to provide a magnetic fishing tool which is very rugged and durable and well protected against accidental damage.

A further object of the invention is to provide a magnetic fishing tool which will very firmly hold the magnetic junk or fish.

Another object of the invention is to provide a magnetic fishing tool capable of holding a very large number of separate fish.

Still another object of the invention is to provide a magnetic fishing tool which will more nearly assure a one hundred percent removal of all the junk than will previously known tools.

Another object of the invention is to provide a magnetic fishing tool that is very easily manufactured and repaired and maintained.

Other objects and advantages of the invention will appear from the following description of two preferred embodiments of the invention.

It will be understood that in working toward the foregoing objects, certain constructions are better adapted for the attainment of some of the stated objects and other constructions are better suited for the attainment of other of the stated objects, so that certain compromises must be effected, and that according to the weight and importance attached to different objects the preferred embodiments will differ.

Reference will be made to the accompanying drawings wherein.

Figure 1:
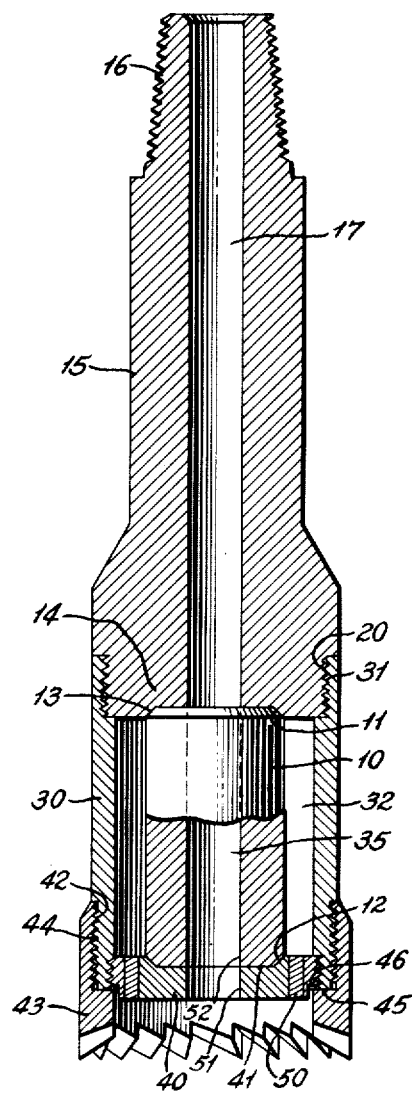
Figure 1 is a vertical section through one form of magnetic fishing tool embodying the invention.

Referring to Figure 1 there is shown a magnetic fishing tool including a permanent bipolar ring magnet 10 having opposite poles at its upper and lower ends. The magnet has the shape of an elongated cylindrical tube and is tapered or beveled slightly at its ends at shown at 11 and 12. The magnet is made of one of the modern ferromagnetic alloys having a high retentivity and field strength. A suitable magnetic material is described in Quick Magazine of May 28, 1951, at page 47, where it is indicated that such a magnet is manufactured by the General Electric Company and marketed under the name "Alnico V." Such magnets may consist of a combination of cobalt, aluminum, nickel and iron. Such magnets may also include platinum as one of the alloyed materials and are known as platinum magnets.

The upper beveled end 11 of the magnet is received in a correlative recess 13 in a head 14 which forms a portion of the end of a pipe section. This pipe section has a cylindrical fishing neck 15 with a screw thread 16 on its upper end adapted to engage a fluid conduit such as a drill pipe, drill collar, or tubing string. The pipe section has a central fluid passageway 17 extending from the upper end to the lower end thereof to provide passages in the head and pipe section above the head. The lower end of the pipe section is provided with a screw thread 20. The head is made of high permeability ferromagnetic material of low retentivity.

A cylindrical tube or sleeve 30 has an internal thread 31 engaged with the thread 20 on the lower end of the pipe section. Tube or sleeve 30 is made of high permeability low retentivity ferromagnetic material and in conjunction with the head which bridges over between and connects the upper ends of the sleeve and magnet conducts the flux from the upper pole of the magnet down to the level of the lower pole of the magnet where there is induced an annular pole disposed around and concentric with the pole at the lower end of the magnet and of opposite polarity. It is thus apparent that the magnet or core, head and the sleeve 30 form a magnetic path and that a part of said path is a permanent magnet. It is further apparent that there is a magnetic pole at the lower end of the magnet or core and an opposite polarity magnetic pole at the portion of sleeve 30 which is disposed adjacent to the lower end of the core, said opposite polarity magnetic pole being disposed around said core pole.

The cross-sectional area of tube or sleeve 30 is preferably at least equal to that of magnet core 10. Inasmuch as tube or sleeve 30 also forms a housing surrounding and protecting magnet 10, the sleeve is preferably made of tough steel. The inner diameter of the sleeve is greater than the outer diameter of the magnet leaving an annular space 32 therebetween. The opening 35 through the tubular magnet 10 provides a fluid passage connecting with passageway 17.

Space 32 provides a region free of ferromagnetic material to prevent short-circuiting of the magnet so as to insure maximum field intensity at the bottom of the magnet or core and the bottom of the housing or sleeve which is disposed around the magnet. Means is provided bridging over the lower end of space 32 to support the lower end of the magnet core from the lower end of the sleeve 30 and to prevent the entrance of any ferromagnetic material into space 32 which might short circuit the magnetic path. This bridging means comprises a disc-shaped pole plate 40 having a recess 41 in its upper face corresponding to and receiving the lower end of the magnet 10. Plate 40 extends from the lower end of the magnet or core 10 into contact with the sleeve 30, having a screw thread on its exterior engaging a similar thread inside the lower end of the sleeve. Sleeve 30 also has a screw thread 42 on the outside at its lower end and a rotary shoe 43 has an internal thread 44 which engages thread 42. The rotary shoe is thus attached to the sleeve and extends downwardly from the lower end of the sleeve. An internal shoulder 45 on the rotary shoe extends beneath and abuts against the lower end of the sleeve. Shoulder 45 also extends beneath a shoulder 46 on the pole plate, there being a slight space between shoulders 45 and 46 to prevent interference.

Tube or sleeve 30 and rotary shoe 43 may be considered together as being a shell of magnetic material which is disposed around and is spaced from the centrally positioned magnet or core 10. As thus described, it is apparent that a portion of the shell is disposed adjacent to the lower end of the core and, of course, in the embodiment shown in Fig. 1 the lower end of sleeve 30 is disposed adjacent to the lower end of the core and part of the rotary shoe itself is also disposed adjacent to the lower end of the core. The core, head, and shell form a magnetic path, there being a magnetic pole at the lower end of the core and an opposite polarity magnetic pole at the portion of the shell which is disposed adjacent to the lower end of the core. Of course, the opposite polarity magnetic pole is disposed around the core pole.

The rotary shoe may have any desired axial extent and number of teeth and may be of helical shape such as that shown on page 740 of the 1951 edition of the Composite Catalogue of Oil Field and Pipe Line Equipment. The shoe chosen should be adapted to the particular type and disposition of junk being fished for. If the junk is flat on the bottom of the hole, a plain ring having no teeth and coplanar with the pole plate bottom face would be suitable. Where there are a number of drill bit cones to be recovered, a toothed shoe as shown would be suitable. A helical shoe would be useful in recovering junk standing on end and leaning against one side of the hole.

Pole plate 40 is a composite member including a central area of disc-shape adjacent the lower end of the magnet core and formed of tough ferromagnetic material such as mild steel. The pole plate also includes an outer ring of magnetic material, the magnetic material being similar to that of the central area. Between the central area and the outer or peripheral area is a ring 50 of brass or other non-ferromagnetic material. Ring 50 constitutes an extension of the non-ferromagnetic region of space 32. It is thus apparent that the central plate area, core, head, sleeve, and peripheral plate area form a magnetic path. It is further apparent that there is a magnetic pole at the central plate area and an opposite polarity magnetic pole at the peripheral plate area disposed around the central plate area pole. A fluid passage 51 through the central area of the pole plate is of the same diameter as the passage 52 through the interior of magnet core 10, which in turn is of the same diameter as passage 17 in the head 15 so that there is no constriction in the fluid path and consequently there will be no cutting action on the elements thereof.

It may be added that viewed broadly the central magnetic area of the pole plate forms an extension of the core and when the term core is used in the claims hereof without reference to the pole plate it is to be understood that the term core may include such an extension.

The pole plate partially bridges the gap between the lower ends of the magnet and housing so as to reduce the reluctance of the magnetic circuit and help maintain the magnetism of the permanent magnet. The gap is sufficient however to cause the field to be distributed over the inner and lower surfaces of the rotary shoe and its teeth. Due to the concentric disposition of the magnetic circuit, the flux lines are radial and hence more concentrated near the center of the tool. Small pieces of junk will therefore be drawn to the center pole and will not bridge over the gap. Large pieces will bridge only part of the gap in a particular sector of the radial field. Therefore, the contacting of even several bit cones and many bearings will not completely short circuit the magnet which will still hold additional junk on contact therewith. It may be noted that although the magnet exerts a strong attraction for junk not in contact with it when brought into proximity therewith, by far the greatest attractive force occurs upon contact with the magnet or other junk already in contact therewith and maximum force is exerted on large pieces bridging the gap.

The central or axial position of fluid passages 51, 52 in the center pole at the lower end of the magnet and the center part of the pole plate insures that the entire lower surface of the tool and any junk adjacent thereto or caught thereon is at all times swept clean of mud and detritus which insures that a good contact will be obtained providing a firm hold on the junk. Since the center of the magnet core is hollow and the opposite pole induced at the lower end of the sleeve is around the outside of the magnet core requiring no crossing of the flux lines from one side of the magnet core to the other, the field strength at the center of the tool will not be great so that junk will not tend to bridge over the fluid passage 52.

The pole plate not only serves to control the strength and disposition of the magnetic field but also to protect the magnet against damage during fishing operations, magnets of this type often being somewhat brittle. The three sections of the pole plate should be either cast or soldered together to insure maximum strength.

After the tool has been assembled the magnetization of the magnet may be accomplished by placing the whole tool in a strong unidirectional field. On removal of the tool from the field the flux reverses in the housing. By magnetizing the magnet in this manner while assembled in the tool, a much greater field strength is obtained than if the magnet is separately energized and then assembled in the tool. The magnetic circuit of the fishing tool comprising the tubular magnet together with the highly permeable low retentivity housing lends itself to magnetization by the method just described. This method of magnetizing is described and claimed in my copending application Serial No. 381,187, filed September 1953, and now abandoned.

Figure 2:
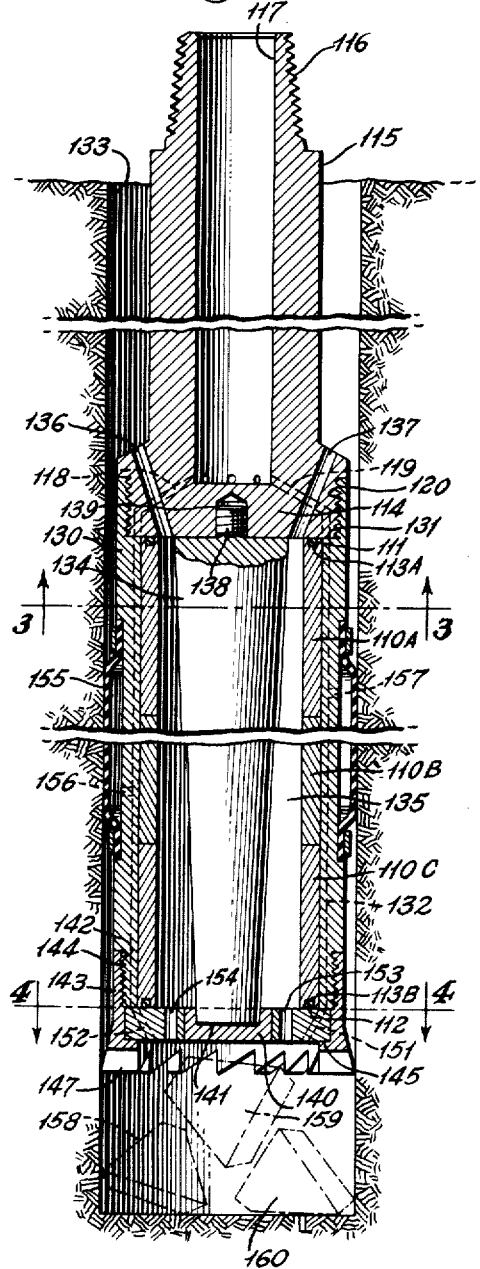
Figure 2 is a vertical section through another form of magnetic fishing tool embodying the invention.
Figure 3:
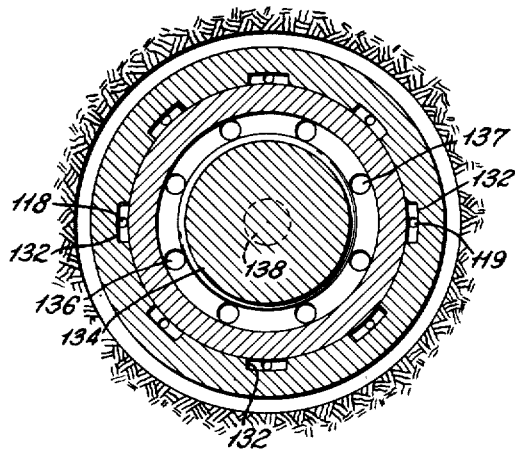
Figure 3 is a horizontal section taken on the line 3—3 of Figure 2.
Figure 4:
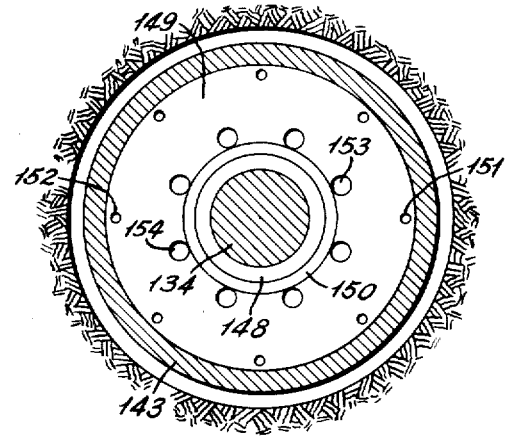
Figure 4 is a horizontal section taken on the line 4—4 of Figure 2.

Referring now to Figures 2 through 4 there is shown another form of the invention also using permanent ring magnets but arranged for reverse circulation. Most of the parts are similar to parts of the tool shown in Figure 1, and such counterparts are given the same numbers as in Figure 1 except for the addition of one hundred thereto.

The tool includes a permanent bipolar ring magnet having opposite poles at its upper and lower ends. The magnet has the shape of an elongated cylindrical tube which conveniently may be made up of a number of short sections such as 110A, B, C. Each of the sections is a bipolar ring magnet having opposite polarity poles at its upper and lower ends and the sections are disposed with unlike poles adjacent so as to be additive in their effects. The upper and lower ends of the composite magnet are channeled at 111, 112 to receive O ring gaskets 113A, B. The adjacent ends of the magnet sections are closely fitted to eliminate any air gaps. As in the Figure 1 embodiment, the composite magnet is made of one of the modern ferromagnetic materials having a high retentivity and high permeability so as to assure a high field strength when magnetized.

The magnet is disposed just below the head 114 of the tool. Head 114 forms a portion of the end of a pipe section having a cylindrical fishing neck 115 with a screw thread 116 on its upper end to engage a fluid conduit such as a drill pipe, drill collar, or tubing string. The pipe section has a central passageway 117 in its upper portion communicating with a plurality of circumferentially spaced apart downwardly diverging fluid passages, such as those shown at 118, 119. The lower end of the pipe section is provided with an external screw thread 120. The head is made of high permeability ferromagnetic material of low retentivity.

A cylindrical sleeve 130 has an internal thread 131 engaged with thread 120 on the lower end of the pipe section. Sleeve 130 is made of non-magnetic material and has an internal diameter substantially equal to the outer diameter of magnet sections 110A, B, C, which are snugly fitted therein. The sleeve 130 forms a housing surrounding and protecting the magnet 110A, B, C and therefore is preferably made of a hard tough material such as brass, Monel, or stainless steel. A plurality of vertical fluid channels such as 132 (see also Figure 3) are formed on the inside of sleeve 130 communicating at their upper ends with passages 118, 119 and the rest of the like passages in head 115.

Being non-magnetic, sleeve 130 does not itself short circuit the magnet rings 110A, B, C, and also prevents them from contacting any casing in the hole 133 in which the tool is used. In this embodiment, instead of returning the magnetic flux from the permanent magnet outside thereof through sleeve 130, the return path for the magnetic flux is provided inside the permanent magnet by a core 134, made of highly permeable ferromagnetic material of low retentivity such as soft iron or low carbon steel. The core 134 is coaxially disposed inside the magnet rings 110A, B, C and is of frustro-conical shape having a largest diameter which is less than the internal diameter of the composite permanent magnet 110 leaving an annular space 135 therebetween. A stud 138 on core 134 engages threaded hole 139 in head 114 which bridges over between the upper ends of the permanent magnet 110A, B, C and core 134. The head and the core conduct the flux from the upper pole of the magnet down to the level of the lower pole of the magnet where there is induced a center pole concentric with the annular pole at the lower end of the magnet and of opposite polarity. The minimum cross-sectional area of the core is preferably at least equal to that of the magnet.

Space 135 provides a region free of ferromagnetic material to prevent short circuiting of the magnet 110A, B, C by core 134 so as to insure maximum field intensity at the bottom of the tool. Since short circuiting at the top of the magnet does no harm, the tapered core provides additional area at the upper end of the core to further reduce the reluctance of the magnetic circuit as a whole. Space 135 also serves as a fluid passage for the upward return of fluid discharged at the bottom of the tool from channels 132, and the head 115 is provided with a plurality of upwardly diverging passages such as 136, 137 which connect space 135 with the exterior of the tool for the discharge of fluid therefrom.

A disc shaped pole plate 140 has a recess 141 in its upper face corresponding to and receiving the lower end of the core. The plate extends beneath magnet 110A, B, C and overlaps the lower end of sleeve 130. Sleeve 130 has an external screw thread 142 on its lower end. A rotary shoe 143 has an internal thread 144 which engages thread 142. An internal shoulder 145 on the rotary shoe engages beneath the lower face of the pole plate whereby on tightening the rotary shoe the whole assembly is firmly held together. The rotary shoe is preferably made of ferromagnetic material like the shoe shown in Figure 1 and may have any of the forms described in connection with Figure 1. As shown in Figure 2 the rotary shoe is in the form of a cutter having a plurality of teeth such as 147.

The pole plate 140 is a composite member including a central area 148 (see also Figure 4) of disc shape adjacent the lower end of the core 134 and an outer ring 149 adjacent the lower ends of the magnet 110A, B, C and sleeve 130, both the central disc and outer ring being made of tough ferromagnetic material such as mild steel. Between the central disc and outer ring is a ring 150 of brass or other non-ferromagnetic material. This ring constitutes an extension of the non-ferromagnetic region of space 135. The central disc 148 of the pole plate forms an extension of core 134 and the outer ring 149 forms an extension of the magnet 110A, B, C. A plurality of circumferentially spaced downwardly converging fluid passages such as 151, 152 through outer ring 149 communicate with the channels 132 directing fluid toward the center of the pole plate, and a plurality of circumferentially spaced passages such as 153, 154 through the outer ring 149 closely adjacent brass ring 150 communicate with space 135 and convey fluid from beneath the pole plate upwardly into the tool. In order to prevent flow of liquid up around the outside of sleeve 130 there is provided a packer comprising an expansible sleeve 155 surrounding the sleeve and sealed thereto at its upper and lower edges. A plurality of passages such as 156, 157 extend through sleeve 130 between the interior of the packer and the channels 132 inside the sleeve.

The tool of Figure 2 is thus arranged for reverse circulation. Fluid from the drill string passes down through the passages formed between the channels in the sleeve 130 and ring magnet 110 an dthen sweeps inwardly across the pole plate beneath ring magnet 110 and back up around the brass ring of the pole plate and the core 134 and thence out of the tool into the annulus between the drill string and the well wall 133. Fluid pressure is transmitted to the interior of the packer sleeve and expands it against the well wall to prevent normal circulation. The radially inward direction of the fluid across the pole plate adds to the magnetic force acting in the same direction so as to facilitate the movement of junk metal such as bit cones 158, 159, 160 toward the lower end of core 134.

Like the tool of Figure 1, the tool shown in Figure 2 is preferably magnetized after it has been assembled by placing the tool as a whole in a strong unidirectional field. On removal of the tool from the field the flux reverses itself in the core.

Figure 5:
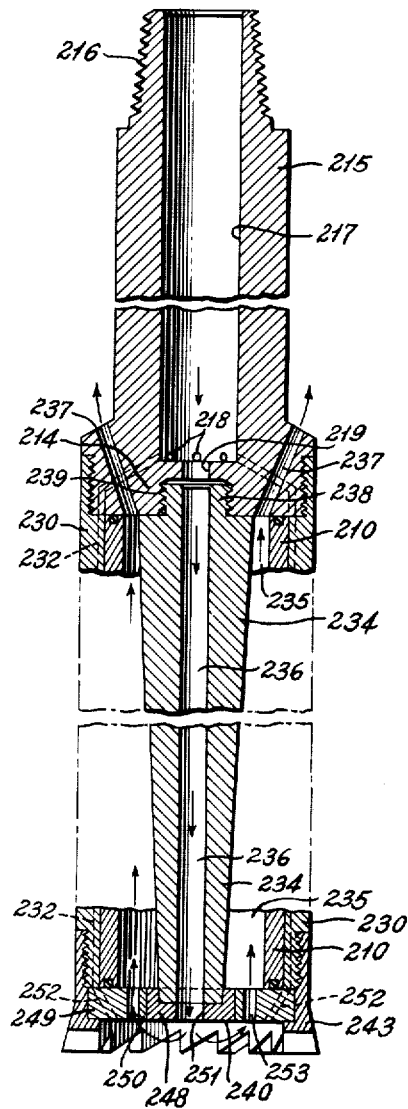
Figure 5 is a fragmentary vertical sectional view of a further modified embodiment of the magnetic fishing tool of this invention.

It will be noted that in both the Figure 1 and Figure 2 embodiments of the invention the fluid is ultimately discharged to the side of the tool. In the Figure 1 embodiment the fluid, after passing through the ring magnet, leaves through passage 54 in the pole plate and flows underneath the pole plate radially outwardly and thence beneath or between the teeth of the rotary shoe where it finally leaves the tool entirely and passes out into the annulus between the tool and the well wall. In the Figure 2 embodiment the fluid, after passing through the ring magnet, leaves through ports such as 136, 137 in the head and passes into the annulus. In both embodiments the fluid passes transversely across the lower end of the ring magnet in a radial direction toward the opposite polarity pole concentric with the pole at the lower end of the ring magnet. It is also apparent that the Figure 2 embodiment could be provided with a fluid passage through the core as in Figure 1. The tool of Figure 5 illustrates such a modified embodiment having an elongated annular magnet 210 disposed immediately below the head 214 which forms a portion of the end of a pipe section having a cylindrical fishing neck 215. Screw threads 216 are provided on the upper end of neck 215 to connect with a fluid conduit such as a drill pipe, drill collar or tubing string. The pipe section has a central passageway 217 communicating with circumferentially spaced downwardly diverging fluid passages 218 and a central passage 219. A cylindrical sleeve 230 is threadably connected to the pipe section. This sleeve is made of non-magnetic material and encloses the annular magnet 210. A plurality of vertical fluid channels 232 are formed on the inside of sleeve 230 communicating at their upper ends with passages 218.

The return path for the magnetic flux is provided by a core 234 made of highly permeable ferromagnetic material of low retentivity such as soft iron or low carbon steel. Core 234 is coaxially disposed within magnet 210 leaving an annular space 235 therebetween. The core is provided with a fluid passage 236 communicating at its upper end with central passage 219 in the head. A stud 238 on core 234 engages a threaded hole 239 in head 214. The annular space 235 communicates at its upper end with upwardly diverging passages 237 to discharge fluid exteriorly of the tool.

A disk shaped pole plate 240 is engaged with the lower end of core 234 and extends beneath magnet 210 and the lower end of sleeve 230. A rotary shoe 243 is threadably connected to sleeve 230 and provided with an internal shoulder engaging beneath the lower face of pole plate 240. Pole plate 240 includes a central disk shaped area 248, an outer ring 249, and an intermediate ring 250 of brass or other non-ferromagnetic material. Area 248 and ring 249 are of ferromagnetic material such as mild steel. Area 248 has a fluid passage 251 communicating with passage 236 in core 234. Ring 249 has a plurality of downwardly converging fluid passages 252 communicating at their upper ends with passages 232. Additionally, in the pole plate, there are provided a plurality of circumferentially spaced passages 253 communicating with the space 235 between core 234 and magnet 210.

The magnetic flux path and pole relationship of the fishing tool of Figure 5 is identical to that described hereinabove in connection with Figure 2. In the Figure 5 embodiment, the fluid flowing downwardly through fishing neck 217 passes through core 234 and passage 251 to flow underneath the pole plate radially outwardly and thence into the passages 253 leading upwardly through annular space 235 to be discharged through passages 237. Additionally, fluid from passage 217 flows through passages 218, 232 and 252 to pass radially inwardly and thence up through passages 253 into annular passage 235 and thence out through passages 237.

Certain variations of the embodiments set forth in detail may be mentioned. Although in the embodiments specifically illustrated ring magnets have been shown it will be appreciated that within the scope of this invention the permanent magnet means may be formed in an annular configuration by a variety of different arrangements of the permanent magnet material. It will also be apparent that fluid passages could be disposed and formed within the magnetic fishing tool of this invention other than as specifically illustrated in the embodiments of the drawings within the scope of the accompanying claims. Also, the core of the Figure 2 embodiment could be made a permanent magnet as well as the rings and the sleeve of the Figure 1 embodiment could be a ring magnet as well as the ring magnet core, but in these latter cases where permanent magnets are used in both the inner and outer portions of the magnetic circuit the magnets must either be magnetized before assembly or by means of a coil placed between the inner and outer magnets or some other suitable manner to care for the opposite flux directions therein.

While preferred embodiments of the invention and a number of variations thereof have been shown and described, it is obvious that many modifications thereof can be made by one skilled in the art without departing from the spirit of the invention. It is desired to protect by Letters Patent all forms of the invention falling within the scope of the following claims.

I claim:

1. A fishing tool for wells comprising, a hollow body, means to connect said body to a fluid conduit, a permanent bar magnet fixed within said hollow body, ring shaped permanent magnets within said body spaced outwardly from said bar magnet to create a circulation return space upwardly through said body between said bar and ring magnets, and fluid channels between said rings and said body to provide for the downflow of fluid to the lower end of the tool, passage means connecting said channels at their upper ends with said means to connect the tool to a fluid conduit, passage means connecting said channels at their lower ends with the exterior of said tool, and passage means connecting the upper part of said circulation return space with the exterior of the tool so that circulation tends to assist the magnet attraction for the junk.

2. A magnetic fishing tool comprising elongated permanent magnet means arranged in a generally annular configuration with said annular configuration having an upper end and a lower end and the magnetic flux lines extending longitudinally in one direction from one end to the other, means providing a ferromagnetic path for conducting the flux between the upper end of said magnet means and to adjacent the lower end thereof, this last named means including a member of ferromagnetic material concentrically disposed with respect to and spaced from said magnet means and a head of ferromagnetic material connecting the upper end of said magnet means to said member, there being opposite polarity poles at the lower ends of said magnet means and said member disposed one inside and spaced from the other, means retaining said member and said magnet means connected to said head, a pipe surmounting said head having means on the upper end thereof to connect to a conduit, means for conducting fluid through the tool, the last said means including a plurality of fluid passage means, said magnet means providing one of said passage means in which the fluid flows inside the magnet means parallel to the axis of the magnet means from one end of the magnet means to the other end of the magnet means, another of said passage means including a passage through said head and conducting fluid from the conduit to one end of said magnet means to admit fluid thereto, one of said last two recited fluid passage means conducting fluid downwardly and discharging the fluid from the tool to travel across the pole at the lower end of the magnet means before it rises again.

3. A magnetic fishing tool comprising two coaxial elongated members disposed one around and radially spaced from the other, said other member forming a core having an upper end and a lower end, said one member forming a sleeve having an upper end adjacent the upper end of said core and having a portion adjacent the lower end of said core, a head connecting the upper ends of said core and sleeve, one of said core and sleeve being a permanent magnet and the other of said core and sleeve together with said head being made of ferromagnetic material forming a path for conducting magnetic flux between the lower end of said core and the adjacent portion of said sleeve to provide opposite polarity poles at the lower end of said core and the adjacent portion of said sleeve, a pipe surmounting said head having means on the upper end thereof to connect to a conduit, means for conducting fluid through said tool, the last said means including a plurality of fluid passage means, said magnet including a longitudinal passage forming one of said passage means, another of said passage means including a passage through said head and conducting fluid from the conduit to one end of said magnet to admit fluid thereto, one of said last two recited fluid passage means conducting fluid downwardly and discharging the fluid from the tool to travel across the pole at the lower end of the magnet before it rises again.

4. A magnetic fishing tool comprising permanent magnet means arranged in a generally annular configuration with said annular configuration having an upper end and a lower end and the magnetic flux lines therein extending from one end to the other, means providing a ferromagnetic material path for conducting flux between the upper end of said magnet means and to adjacent the lower end thereof, this last said means including a core of ferromagnetic material inside said magnet means coaxial therewith and radially spaced therefrom and a head of low reluctance material connecting the upper end of said magnet means to said core, said core having a portion adjacent the lower end of said magnet means, there being opposite polarity poles adjacent the lower ends of said magnet means and said core portion, a sleeve of high reluctance material around said magnet means connected to said head and extending from the upper end of said magnet means to the lower end thereof to protect and insulate said magnet means, means retaining said core and said magnet means within said sleeve, passage means in said tool to conduct fluid through said tool from the upper end of said tool to the lower end thereof, and other passage means in said tool to conduct fluid back up through said magnet means to the exterior of said tool.

5. The combination of claim 4 in which the portion of said path formed by said core is a permanent magnet wherein the lines of flux extend from one end to the other in the same direction as the flux of said magnet means along said portion of said path.

6. The combination of claim 4 in which one of said passage means includes a passage in said head to conduct fluid through said head and fluid conduit means communicating with said passage and disposed between said magnet means and said sleeve, and the other of said passage means includes a passage to conduct fluid from said magnet means through said head to the exterior of the tool.

7. The combination of claim 6 in which there is means on the exterior of said sleeve to engage a well wall and seal there between to positively cause fluid discharged from the lower end of said fluid conduit means to sweep across the lower end of said magnet means and enter the lower end of said magnet means.

8. The combination of claim 7 in which said retaining means includes a pole plate at the lower end of said tool including central and outer portions of tough low reluctance material in contact with the lower ends of said core and magnet means respectively and forming extensions thereof and an intermediate portion of high reluctance material disposed between and separating said central and outer portions, said plate being provided with fluid passages therethrough communicating at their upper ends with said fluid conduit means and the interior of said magnet means.

9. The combination of claim 8 in which said magnet means is a composite of a plurality of ring sections of less axial length than said magnet means stacked end to end between said head and plate and fitted closely within and held coaxial by said sleeve.

10. A magnetic fishing tool comprising generally annular permanent magnet means having an upper end and a lower end with the magnetic flux lines extending longitudinally in one direction from one end to the other, a member of ferromagnetic material concentrically disposed with respect to and spaced from said magnet means, a head of ferromagnetic material connecting the upper end of said magnet means to said member, said member and said head providing a ferromagnetic path for conducting the flux between the upper end of said magnet means and to adjacent the lower end thereof so that there are opposite polarity poles disposed one inside and spaced from the other at the lower ends of said magnet means and said member, a pipe extending upwardly relative to said head and having means on the upper end thereof to connect to a conduit, a sleeve concentrically disposed with respect to said magnet means and said member and connected to said pipe to form an exterior surface of said tool, means retaining said member and said magnet means within said sleeve, means for conducting fluid through said tool including a plurality of fluid passage means, said magnet means providing one of said passage means in which the fluid flows inside the magnet means from one end to the other end thereof, another of said passage means including a passage through said head and conducting fluid from the conduit to one end of said magnet means to admit fluid thereto, one of said last two recited fluid passage means conducting fluid downwardly and discharging the fluid from the tool to travel across the pole at the lower end of the magnet means before it rises again.

References Cited in the file of this patent
UNITED STATES PATENTS

| | | |
|---|---|---|
| 2,092,316 | Lane | Sept. 7, 1937 |
| 2,431,361 | Athy | Nov. 25, 1947 |
| 2,522,294 | Noble | Sept. 12, 1950 |
| 2,539,435 | Kirby | Jan. 30, 1951 |
| 2,556,849 | Nolley et al. | June 12, 1951 |
| 2,595,632 | Bivings et al. | May 6, 1952 |
| 2,668,077 | Kirby | Feb. 2, 1954 |
| 2,675,879 | Middleton et al. | Apr. 20, 1954 |
| 2,729,494 | Trowbridge | Jan. 3, 1956 |
| 2,734,767 | Donham | Feb. 14, 1956 |